Feb. 17, 1970 B. AMMON ET AL 3,495,836

PORTABLE RECORDING APPARATUS

Original Filed May 1, 1964 3 Sheets-Sheet 1

INVENTORS:
BRUNO AMMON,
L.C. JAMES KINGSBURY,

BY Thomas A. Briody
THEIR ATTORNEY.

PORTABLE RECORDING APPARATUS

Original Filed May 1, 1964 3 Sheets-Sheet 2

INVENTORS:
BRUNO AMMON,
L.C. JAMES KINGSBURY,
BY Thomas A. Briody
THEIR ATTORNEY.

INVENTORS:
BRUNO AMMON,
L.C. JAMES KINGSBURY,

BY Thomas A. Briody
THEIR ATTORNEY.

United States Patent Office 3,495,836

Patented Feb. 17, 1970

3,495,836

PORTABLE RECORDING APPARATUS

Bruno Ammon and L. C. James Kingsbury, Decatur, Ill., assignors to General Electric Company, a corporation of New York Original application May 1, 1964, Ser. No. 364,111, now Patent No. 3,336,031, dated Aug. 15, 1967. Divided and this application Aug. 1, 1966, Ser. No. 569,494

Int. Cl. G11b *25/04*

U.S. Cl. 274—9 2 Claims

ABSTRACT OF THE DISCLOSURE

A compact and portable recording apparatus which includes a pause controlling mechanism that comprises an L-shaped actuator, an idler wheel movable between two positions to provide concurrent engagement with a motor driven element and the turntable, and a spring acting (a) upon the idler wheel for normally biasing the wheel into concurrent engagement with the motor driven element and the turntable, and (b) upon the L-shaped actuator to normally maintain it with a pushbutton thereof in its outermost position.

This invention relates to phonograph devices, and more particularly to a compact and portable recording apparatus of the magnetic type.

The present application is a division of our co-pending application Ser. No. 364,111 filed May 1, 1964, now Patent No. 3,336,031 and assigned to the same assignee as the instant application.

There are numerous occasions when persons in varied occupations, such as housewives and businessmen, find need for quickly and conveniently recording messages or letters. For such a purpose it is important that the recording device be sturdy, durable, portable, and very compact in size. It is also desirable that such a device should be extremely simplified in operation, thereby enabling virtually anyone to readily and efficiently utilize the equipment.

Accordingly, it is an important object of the present invention to provide an improved, compact, and portable phonographic device.

It is another object of this invention to provide an improved portable recording and reproducing apparatus of the magnetic type, which is constructed in such a manner that it is extremely compact in size.

It is a further object of this invention to provide an improved arrangement for selectivley coupling a driving mechanism to a turntable.

A still further object of our invention is to provide an improved magnetic recording device which due to its relative simplicity may be manufactured at a reduced cost.

In carrying out the present invention, in one form thereof we provide an improved arrangement for selectively coupling the motor of the phonograph device to the turntable. In this arrangement the motor driven element rotates about an axis parallel to the axis of rotation of the turntable. A coupling element located above the support is movable in a plane perpendicular to the axes of the driven element and the turntable and coacts with the driven element and the turntable for transmitting motion from the driven element to the turntable. With the aforesaid structure, an actuator is structurally arranged to pivot on the support for controlling the movement of the coupling. This actuator is of generally L-shaped configuration and includes a manually depressible portion and a motion transmission portion. The manually depressible portion is movable in a direction parallel to the axes of the turntable and the motor driven element. The motion transmission portion is constructed and arranged for connection to the coupling to move the coupling into and out of engagement with the turntable and the motor driven element upon movement of the manually depressible portion of the actuator.

By further aspects of the present invention, additional desirable features may be included in the phonograph device, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings in which:

Figure 1:
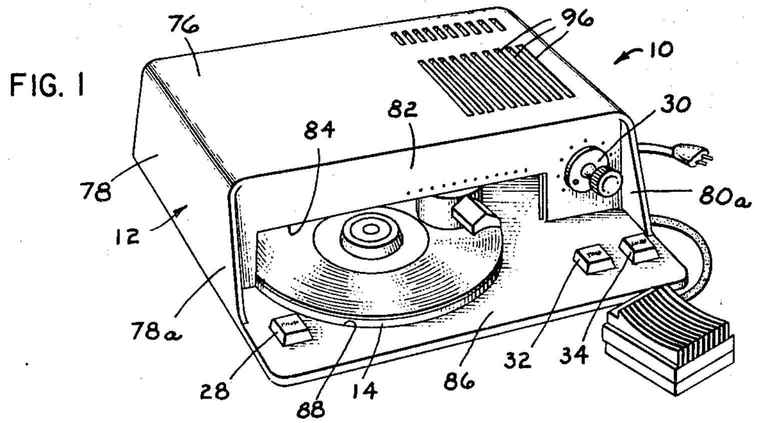
FIG. 1 is a perspective view of a magnetic recording and reproducing device embodying the present invention, in one form thereof.
Figure 2:
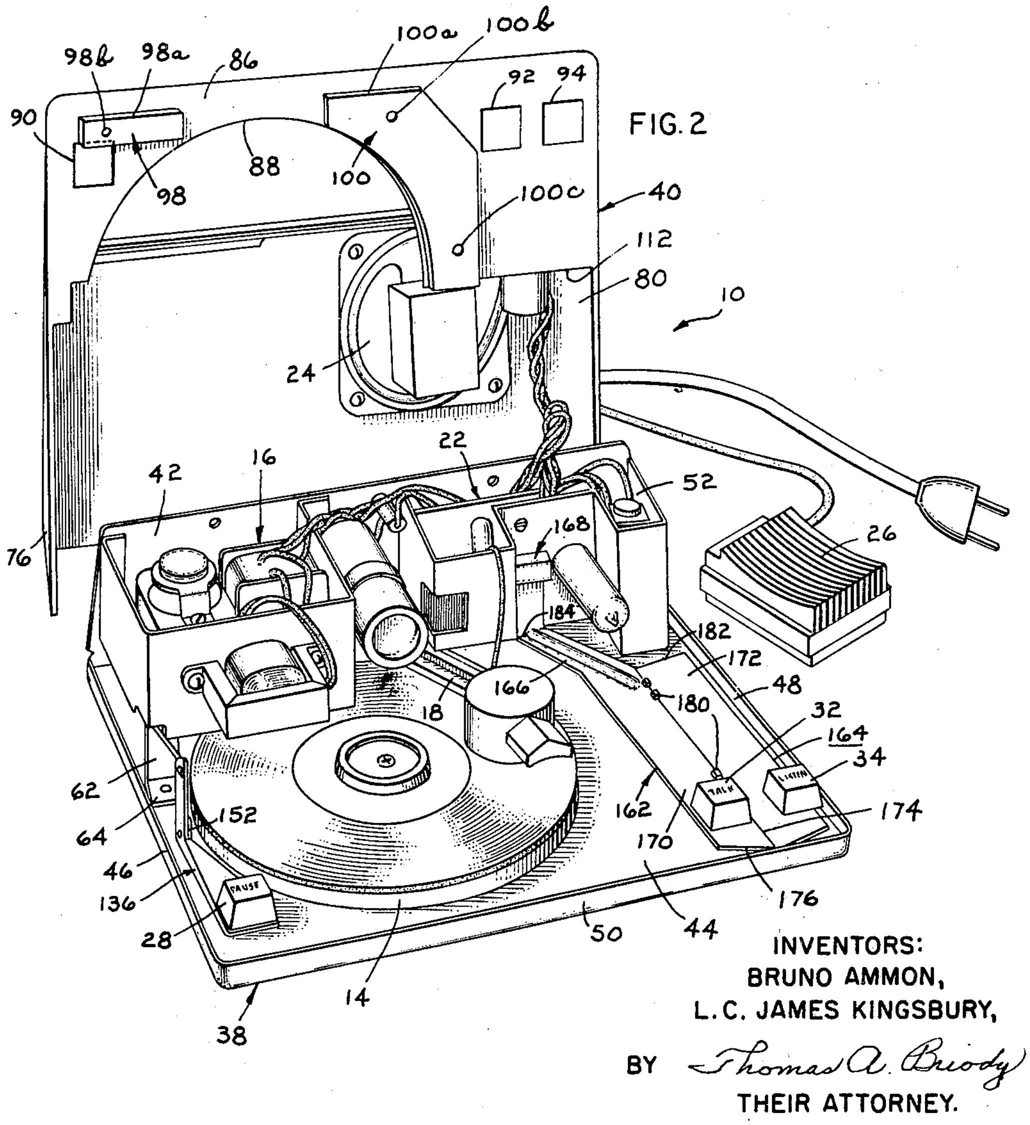
FIG. 2 is an enlarged perspective view of the device shown in FIG. 1, with the superstructure of the housing exploded and rotated by 90° from the main support to show the interior structural elements of the device.

Referring in detail to the drawings, and in particular to FIGS. 1 and 2 thereof, there is shown a disc-type recording device 10 embodying one form of our invention. The recording device 10 essentially comprises a housing 12 wherein the turntable 14 and its driving motor 16 are located, tone arm 18 and its associated recording and playback head 20 (FIG. 5), amplifier 22, speaker 24, microphone 26, and control knobs 28, 30, 32 and 34. Control knob 28 is for selectively decoupling and coupling motor 16 to the turntable 14, thereby facilitating desired interruption of the driven operation of the turntable 14. Knob 30 may be rotated to energize amplifier 22 and to selectively vary the volume provided thereby. The knobs 32 and 34 may be alternatively depressed to operate a slider operated switch unit 36 (shown in FIG. 4) which sets the electronic circuit for either recording or playback operation.

Figure 3:
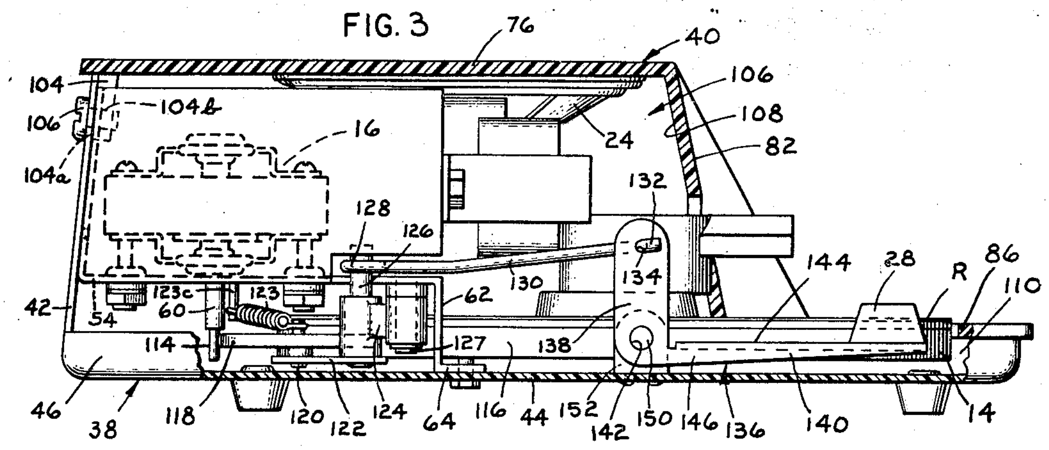
FIG. 3 is a left end view of the device shown in FIG. 2, partially in section, and partially broken away.
Figure 4:
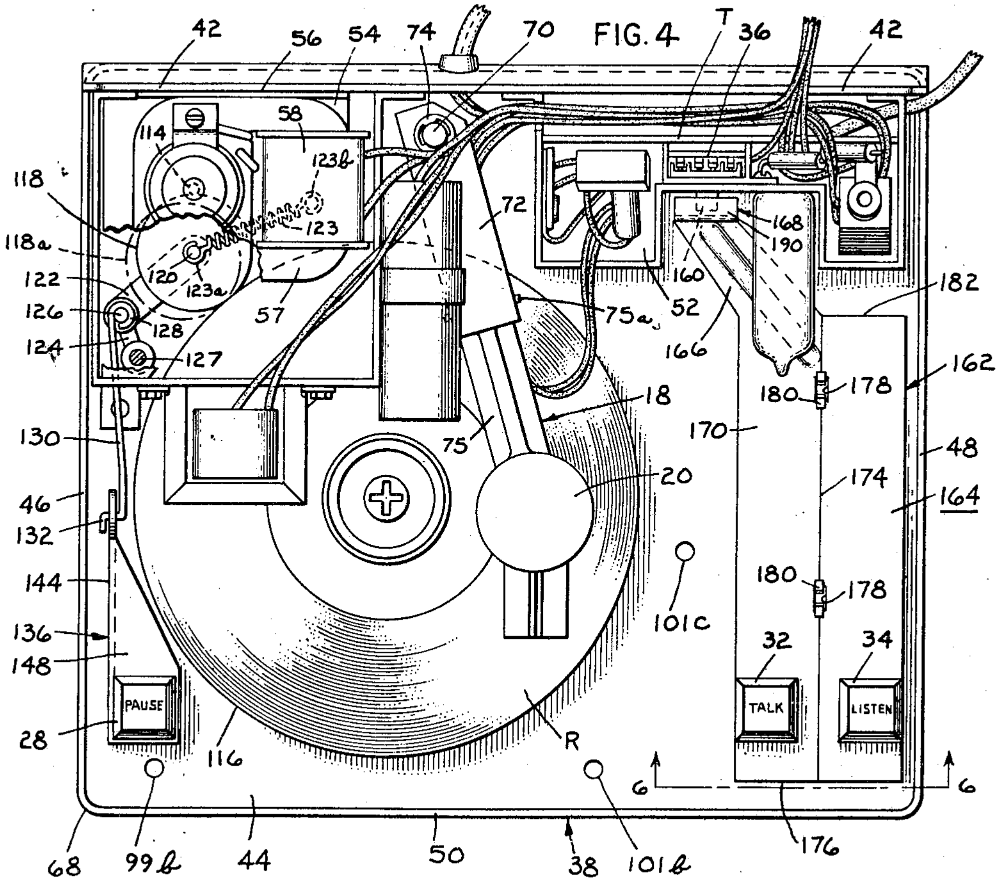
FIG. 4 is a plan view related to FIG. 2 of the main supporting section of the recording device with its components thereon.
Figure 5:
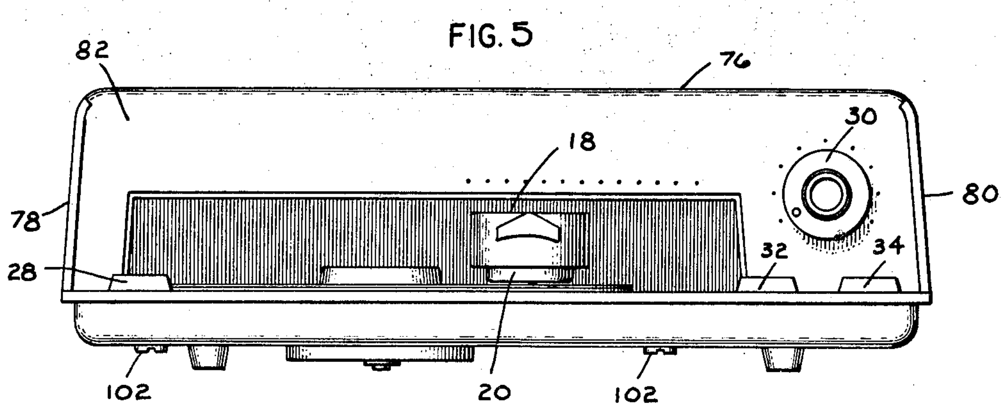
FIG. 5 is a front view of the device.

Turning now to a first important aspect of the present invention embodiment, whereby there is provided a recording apparatus of compact construction and simplified arrangement, attention is further directed to FIGS. 3 and 4. As shown in FIG. 3, the housing 12 has a generally L-shaped profile provided by the complementary cooperation of a generally L-shaped base plate 38 and a substantially L-shaped molded superstructure 40.

The L-shaped base plate 38 includes a vertical wall 42 which serves as the back of the housing 12, and an enlarged horizontal plate portion 44 which has upwardly turned side flanges 46, 48 and an upwardly turned front flange 50 (FIG. 2). The side flanges 46 and 48 are conterminous with front flange 50, and they are also conterminous with back wall 42. Near the right side of back wall 42 of base plate 38 (viewing FIG. 4) there is secured a hollow generally C-shaped frame 52 which serves as a supporting chassis and framework for the circuit components and connections of amplifier 22.

For supporting motor 16, near the left side of back wall 42 of the base plate 38 (viewing FIG. 4) there is secured a horizontal supporting bracket 54 which has an upwardly extensive vertical flange 56 secured to back wall 42. The motor 16 is of a suitable and well known type, and includes a magnetic yoke 57 which carries a motor field coil 58, and a depending shouldered shaft 60 which is arranged to drive the turntable 14. To furnish additional support for motor 16, an L-shaped extension 62 is formed on the front of bracket 54. Extension 62 includes a horizontal foot 64 that is secured to the bottom wall 44 of the housing, as shown in FIG. 3.

For carrying and revolving disc-type records, the turntable 14 is rotatably journalled and supported on bottom wall 44. Turntable 14 is preferably 6¼ inches in diameter, thereby enabling it to play a record R which has approximately the same standardized size well known in the art heretofore for playing the popular 45 r.p.m. record. The turntable 14 is positioned for rotation on horizontal plate 44 as indicated in FIG. 4, being located with its axis of rotation perpendicular thereto, and being disposed closely adjacent to the lower left hand corner 68 (i.e. nearest to the side flange 46 and front flange 50) of the supporting plate 38.

For recording and reproducing information on records played by turntable 14, the tone arm 18 is supported for horizontal movement about post 70. As shown in FIG. 4, post 70 extends upwardly in perpendicular fashion from plate 44 near rear wall 42 and in remote disposition from side flanges 46, 48. Supporting section 72 of tone arm 18 is arranged for horizontal movement on post 70 by fitting a suitable bearing aperture (not shown) of the supported end of section 72 around post 70 and securing the tone arm to the post 70 via C-shaped retaining clip 74. The other section 75 of the tone arm is pivotally attached to the free end of section 72 by a horizontal bearing pin **75*a* to facilitate vertical movement of the head 20 which is carried at the free end of section 75**.

In addition to supporting the turntable 14 and tone arm 18, the horizontal base plate 38 also supports motion transfer mechanisms which include the aforementioned knobs 28, 32, 34. These motion transfer mechanisms form important aspects of the present invention and shall be described in detail hereinafter.

The superstructure 40 of the housing 12 comprises a generally flat top 76 conterminous at its sides with oppositely disposed and vertically arranged side walls 78, 80. The front of top 76 of superstructure 40 is conterminous with the top of a front wall 82, wall 82 being bounded on its sides by tapered forward extensions **78*a*, 80*a* of the side walls 78, 80. To facilitate an attractive and streamlined frontal appearance for the housing 12, the front wall 82 is tapered upwardly and rearwardly, as suggested from viewing FIG. 3. The front wall 82 of the superstructure 40 has an elongated slot 84 formed therein, as illustrated in FIG. 1, to provide clearance for movement of tone arm 16 and access to the turntable 14. A portion of turntable 14 extends outwardly from slot 84 to allow ready access to the turntable for the placement and removal of records R with respect thereto. The bottoms of frontal wall 82 and sides 78, 80 of the superstructure 40 are integrally connected to a horizontal deck 86 which is stepped downwardly from the relatively larger top 76. Deck 86 extends forwardly in horizontal fashion from the bottom of frontal wall 82 for a considerable distance, as indicated in FIG. 1. It should also be noted that deck 86 extends rearwardly from frontal wall 82** for a relatively small distance, as illustrated in FIG. 1.

In deck 86 of the superstructure 40 there are formed a semicircular cutout section 88 and three generally square shaped slots 90, 92 and 94. When the superstructure 40 is secured into complementary engagement with base plate 38 (FIGS. 1 and 3), the semicircular cutout portion 88 of the deck 86 fits around and accommodates approximately one half of the turntable 14 which is arranged therein in flush fashion relative to the top surface of deck 86. The square shaped slot 90 cooperates with and accommodates the square shaped "pause" knob 28 which extends therethrough as shown in FIG. 1. Slots 92 and 94 respectively cooperate with and accommodate the square shaped knobs 32 and 34 which extend therethrough for selectively controlling the recording and playback conditions of the phonograph device 10.

As shown in FIG. 2, the loudspeaker 24 is secured to the underside of top 76 of the superstructure 40, near the right side thereof. To allow sound to readily emanate from loudspeaker 24, a series of elongated parallel cutout apertures 96 are formed in attractive fashion in top wall 76 above the speaker (i.e. near the right side of top wall 76).

To facilitate the convenient attachment of superstructure 40 to base plate 38, thereby forming the compact housing 12, it should be noted that, as shown in FIG. 2, projections 98 and 100 are arranged on the bottom surface of deck 86. The projections 98 and 100 provide forward vertical positioning shoulders **98*a*, 100*a*, and have the threaded apertures 98*b* and 100*b*, 100*c* formed therein. For attachment of the front portion of the superstructure 40 to base plate 38, the shoulders 98*a* and 100*a* are positioned in general contiguity with the inner vertical surface of front flange 50 of base plate 38. The threaded apertures 98*b* and 100*b*, 100*c* of the superstructure 40 are thereupon aligned with apertures 99*b* and 101*b*, 101*c* (FIG. 4) formed in the plate portion 44 of the base plate 38. Screws 102 (FIG. 5) are then extended upwardly from the bottom of plate portion 44 through the apertures 99*b*, 101*b*, 101*c* and threaded into engagement with the aligned apertures 98*b* and 100*b*, 100*c***.

For securing the rear of superstructure 40 to the back wall 42 of base plate 38, a pair of depending flanges 104, one of which is shown by way of example in FIG. 3, are formed on the underside of top wall 76 of the superstructure. Each of the flanges 104 provides a vertical rearwardly facing shoulder **104*a* which engages the inner surface of the top edge of vertical wall 42, thereby laterally positioning the rear of the superstructure 40 in cooperative engagement with the back wall 42 of base plate 38. A screw 106 is extended through an appropriate aperture in vertical wall 42 and threaded into engagement with an aperture 104*b* of each of the flanges 104 for rigidly attaching the rear of the superstructure 40 to the top of the base plate 38**.

When the generally L-shaped superstructure 40 is secured into complementary cooperative engagement with the L-shaped base plate 38, as indicated in FIG. 3, a generally L-shaped recess 106 is formed thereby for supporting and containing the various components of the recording device 10. The recess 106 comprises a body recess portion 108 and a relatively thin deck recess portion 110. The body recess portion 108 is relatively large in front to rear dimension (i.e. between front wall 82 and rear wall 42 of the housing), such as for example approximately 5½ inches at the top, and has a considerably smaller vertical height (i.e. between bottom 44 and top 76 of the housing), such as for example 2½ inches. The deck recess portion 110 may have a front to rear dimension (i.e. between front wall 50 and rear wall 112) of approximately 4½ inches, and a vertical height (i.e. between bottom 44 and front deck 86) of approximately 9⁄16 inch. The width of the front of the housing 12 (i.e. from left wall 78 to right wall 80) may be approximately 10 inches.

When the superstructure 40 is in complementary cooperation with base plate 38 to form housing 12, the body recess portion 108 compactly contains all of the amplifier circuit elements including switch 36, terminal board T, the principal portion of tone arm 18, and motor 16. The deck recess portion 110 compactly contains approximately one half of the turntable 14, with the circular table thereof being arranged as indicated in FIGS. 1 and 2, in complementary cooperation with cutout portion 88. In addition, as previously mentioned, the top surface of turntable 14 is located in generally coplanar or flush relationship with the top surface of deck 86.

It should be noted that an important factor involved in achieving the thinness in depth of deck recess portion 110, is the arrangement of motor 16 in the housing 12. Thus, in view of the fact that motor 16 is arranged at a higher vertical level or elevation than turntable 14, the deck 86 is enabled to be located closely adjacent to the bottom horizontal part 44 of base plate 38. When the recording device 10 is in use, the control knobs 28, 32 and 34 and turntable 14 may thereby be located very close to a horizontal external support (not shown) such as a table, making the device easily accessible and convenient to operate. In addition, since the overall L-shaped recess 106 is utilized for situation therein of the various components of recording device 10, a minimum vertical height of the overall device (e.g. between bottom 44 and top 76 of housing) is effectively facilitated and achieved.

Another important advantage which is achieved by the location and arrangement of the motor 16 in housing 12, is the effective prevention of motor heat from producing deleterious effects upon the tone arm, turntable and electronic circuit elements. Thus, since heat rises, there is a tendency for any heat which emanates from motor 16 to rise upwardly. Such heat may then readily be transferred to the housing 12 and may also pass outwardly through appropriate apertures in the rear vertical wall 42 of the housing. This effectively precludes any possible motor heat damage to the device 10.

Turning now to another important aspect of the present invention embodiment whereby there is provided an improved arrangement for selectively coupling the output of motor 16 to the turntable 14, attention is now directed to FIGS. 2–4. As previously mentioned, the the shouldered driven element 60 of the motor 16 extends vertically downwardly from the yoke 57 and field coil 58. Element 60 is also arranged in the body recess 106 of the housing 12 so that the bottom end 114 of reduced diameter is disposed at approximately the same vertical level as the peripheral rim 116 of turntable 14.

For selectively coupling and decoupling the output of motor 16 to the turntable 14, an idler wheel 118 of appropriate diameter is operated into and out of frictional engagement with the bottom end 114 of motor driven element 60 by the manipulation of the "pause" actuator knob 28. More particularly, as shown in FIG. 3, the idler wheel 118 has a smooth peripheral rim and is rotatably supported on a vertical shaft 120 which extends upwardly from one end of a movable arm 122. The shaft 120 is of sufficient length so that its upper end extends upwardly from the idler wheel 118. Hooked end **123*a* of a tension spring 123 is wrapped around the upper end of shaft 120. The other end 123*b* of tension spring 123 is wrapped around a suitable projection 123*c* on bracket 54 so that the spring 123 exerts a continuous tension force upon idler wheel 118. The other end of the movable arm 122 is pivotally connected to one end of a rotatable link 124 by the extension of vertical pin 126 through aligned bearing apertures of overlapped ends of the link 124 and arm 122. The other end of link 124 is supported for rotation on motor bracket 54 by an associated pin 127. As further indicated in FIG. 3, the pin 126 is of sufficient length so that a substantial portion thereof extends upwardly from link 124. Around the upper end of pin 126 there is wrapped the hooked end 128 of a substantially rigid wire 130. The other end 132 of the wire 130 is crank shaped, and extends through an aperture 134 of motion transfer lever 136**.

The motion transfer lever 136 is constructed from a single flat piece of metal and is generally arranged in an L-shaped configuration. More particularly lever 136 comprises a motion transmitting arm 138 which is connected to an actuating arm 140. The motion transmitting arm 138 extends radially outwardly and upwardly from bearing aperture 142, and the actuating arm 140 extends radially forwardly from bearing aperture 142, the arm 140 being in perpendicular angular relationship to arm 138. As further shown in FIGS. 3 and 4, the actuating arm 140 is bent over along its length at 144 so that it includes a supporting part 146 in coplanar relationship with motion transmitting arm 138, and an actuating platform 148. The actuating platform 148 is in generally perpendicular relationship to the supporting part 146 of the arm 140. Upon the platform 148, near its free end, there is located and secured the "pause" actuating handle 28.

The motion transfer lever 136 is pivotally supported on base plate 38 by the extension of a bearing pin 150 through bearing aperture 142 of lever 136 and through a supporting upright 152 (FIGS. 2 and 3) which is secured to base plate 38. Thus, pin 150 is secured to upright 152 and serves as a bearing for rotatable movement of lever 136 about an axis parallel to the surface of turntable 14. The axis of rotation of lever 136 is also in perpendicular relationship to the axes of rotation of motor driven element 60 and turntable 14.

Turning now to a desciption of the operation of the selective control arrangement for idler wheel 118, attention is further directed to FIG. 4. When handle 30 is rotated in a clockwise direction from its "off" position (viewing FIG. 1) a circuit is energized which allows current to flow through the winding 58 of motor 16. The motor driven element 60 thereupon rotates in a clockwise direction of rotation (viewing FIG. 4). When no downward force is exerted upon "pause" control handle 28, tension spring 123 acts upon shaft 120 of the idler wheel 118 to urge its peripheral rim into concurrent frictional engagement with the reduced diameter end 114 of motor driven element 60 and with the peripheral rim 116 of turntable 14. For this condition, spring 123 also resiliently maintains lever 136 in its FIG. 3 position, wherein control knob 28 is in its uppermost position. The idler wheel 118 is thereupon driven in a counterclockwise direction of rotation (viewing FIG. 4) and in turn drives the turntable 14 in a clockwise direction of rotation (viewing FIG. 4).

When control knob 28 of the "pause" actuating mechanism is depressed downwardly, the lever 136 is thereupon rotated in a clockwise direction (viewing FIG. 3). The motion transmitting arm 138 of lever 136 then pulls pin 126 forwardly (i.e. from left to right, viewing FIG. 3). This causes link 124 to pivot in a counterclockwise direction of rotation (viewing FIG. 4) about its bearing pin 127. The idler wheel 118 is then pulled forwardly and to the left (viewing FIG. 4) to uncouple the peripheral rim of idler wheel 118 from the bottom 114 of the motor driven element 60. The turntable 14 is thus stopped as long as the knob 28 is depressed. When the depressive force on knob 28 is released, the spring 123 returns idler wheel 118 into engagement with motor drive element 60 by pulling shaft 120 rearwardly and to the right (FIG. 4). In addition, when the depressive force exerted upon handle 28 is released, spring 123 also acts upon link 124 through arm 122, to pivot link 124 in a clockwise direction of rotation (viewing FIG. 4). Wire 130 is thereupon pulled rearwardly to act upon lever 136 and rotate lever 136 in a counterclockwise direction of rotation (viewing FIG. 3). The actuating knob 28 is thus returned by spring 123 to its outermost position.

It will now therefore be seen that by the simple expedient of pressing actuator knob 28 downwardly, the idler wheel 118 is decoupled from engagement with motor driven element 60 to stop the turntable 14 from rotating whenever the operator of device 10 desires to do so. It will also be understood that the mechanism for transferring motion from actuator 28 provides a simple and expeditious structure for converting motion from one direction to another direction perpendicular to the first direction.

Turning now to another aspect of the present invention embodiment, which concerns itself with an improved motion transfer mechanism for controlling a switch, attention is directed to FIGS. 2, 4, 6 and 7. As previously mentioned, the control knobs 32 and 34 may be alternatively depressed to operate the slider operated switch unit 36 (shown in FIG. 4) to set the electronic circuit for either recording or playback operation. From viewing FIG. 4, it will also be noted that the actuating handles 32, 34 are located in spaced adjacency to (e.g. alongside of) each other near the frontal vertical flange 50 of base plate 38, whereas the switch unit 36 is located near to rear vertical wall 42 of the base plate 38. More particularly, the switch unit 36 is of the multiple type, and it is secured to terminal board T in such a manner that slider 160, which actuates the movable contact elements of the switch, is movable in a vertical direction to operate the switch (see FIGS. 6–8). The switch unit 36 is a two-position type switch wherein the slider 160 is operable between an upper and a lower extreme position for controlling the circuits connected thereto.

For effectively operating the slider 160 of switch unit 36 in response to the selective depression of actuating knobs 32, 34, in accordance with the present invention, the elongated member 162 has been provided. Member 162 includes a body section 164 (FIG. 4) which has a shallow V-shaped cross section and serves as a rocker type actuator, a relatively flat motion transmitting extension 166 connected at one of its ends to body section 164 and extending angularly away from section 164, and an actuating section 168 which is connected at its bottom end to the other end of extension 166.

The V-shaped body section 164 is of symmetrical configuration, and includes a pair of flat elongated arms 170, 172 joined together at elongated apex 174. Near the forward end 176 of body section 164 there is secured to and mounted above each of the arms 170, 172 an associated one of the actuating handles 32, 34.

Figure 6:
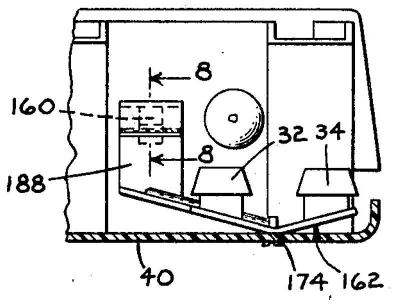
FIG. 6 is a sectional view taken generally along the lines 6—6 of FIG. 4, and illustrating the rocker operated switch mechanism for one switch position.
Figure 7:
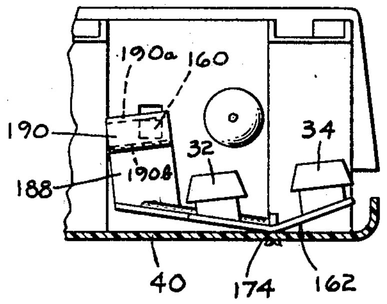
FIG. 7 is a view similar to FIG. 6 for the other switch position.

As further shown in FIG. 4, a pair of elongated slots 178 are formed in body section 164 of member 162, along apex 174. The slots 178 are in general alignment with the apex 174 of member 162. Through each of the slots 178 of member 162 there is loosely extended an upright fastening stud 180 for retaining the apex 174 of the member 162 in engagement with bottom 44 of base plate 38 (as shown in FIGS. 6 and 7). As illustrated for the device 10, the fastening studs 180 are secured to bottom 44 of the base plate. Each stud 180 includes a pair of ears which are extended upwardly through an associated slot 178 and lapped over laterally above the slot 178, thereby loosely retaining the apex 174 of member 162 in engagement with bottom 44 of base plate 38.

Figure 8:
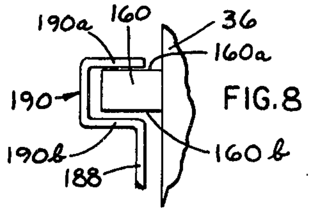
FIG. 8 is a view taken generally along the lines 8—8 of FIG. 6 to illustrate the mode of cooperation between the rocker operated switch actuator and the operable element of the switch unit.

The motion transmitting extension 166 of member 162 is in generally coplanar relationship to arm 170 thereof and extends rearwardly and angularly away from inner end 182 of body portion 164. The end 184 (FIG. 2) of extension 166 is connected to the bottom of actuating section 168. Actuating section 168 includes a vertically extensive shank portion 188 (FIGS. 6–8) which is joined to a U-shaped upper end 190 (FIG. 8.) The U-shaped upper end 190 of the member 162 cooperates with switch slider 160, as shown in FIG. 8.

Turning now to an explanation of the operation of the motion transfer mechanism for switch unit 36, attention is directed to FIGS. 6–8. When the recording control handle 32 is depressed, assuming that slider 160 is in the upper position as indicated in FIG. 6, the V-shaped body 164 of member 162 thereupon pivots about its apex 174 in a counterclockwise direction of rotation (viewing FIG. 6). The upper side **190*a* (FIG. 8) of the U-shaped upper end 190 of member 162 then moves downwardly and engages the top 160*a* of the slider 160 to actuate switch unit 36** to the recording condition.

When the switch unit 36 is set for the recording condition and it is desired to reproduce information already recorded, the replay control handle 34 may then be depressed. The V-shaped part 164 of member 162 then pivots about apex 174 in a clockwise direction of rotation (viewing FIG. 6) so that lower side **190*b* of the U-shaped upper end of member 162 moves upwardly and engages bottom 160*b* of the slider 160 to actuate switch unit 36** to the playback or listening condition.

An effective snap acting type of operation may be achieved for the selective operation of the control knobs 32 and 34 due to the use of a snap acting biasing spring (not shown) in the switch unit 36.

It will thus be seen that the motion transfer mechanism for switch unit 36 represents a simplified and inexpensive structure for providing a rocker type actuation of a slider operated switch located remotely from a pair of depressible actuators.

It will now, therefore, be seen that the present invention provides an effective and simplified means for readily decoupling a motor driven element from a revolvable turntable.

While in accordance with the Patent Statutes, we have described what at present is considered to be the preferred embodiment of our invention, it will be obvious to those skilled in the art that various changes and modifications may be made therein without departing from this invention, and we, therefore, aim in the following claims to cover all such equivalent variations as fall within the true spirit and scope of this invention.

What we claim as new and desire to secure by Letters Patent of the United States is:

1. In a phonograph system, a support, a turntable arranged for rotary movement on said support, a motor driven element disposed on said support and rotatable about an axis parallel to the axis of rotation of the turntable, an idler wheel rotatable about an axis parallel to the axes of rotation of the motor driven element and the turntable, said idler wheel being movable between two positions in a plane perpendicular to its axis of rotation, one of said positions providing concurrent engagement of the idler wheel with the motor driven element and the turntable thereby to drive said turntable, the other of said positions providing disengagement of said idler wheel from said motor driven element thereby to stop said turntable, and a manually operable actuator arranged to pivot on said support for controlling the movement of said idler wheel in a direction perpendicular to its axis, said actuator including a manually depressible portion and a motion transmitting portion, said manually depressible portion being movable between a normal outermost position and a depressed position in a direction parallel to the axes of the turntable, motor driven element and idler wheel, said motion transmitting portion being connected to said idler wheel to move said idler wheel between said positions in response to movement of said manually depressible portion of said actuator, thereby to selectively control the operation of said turntable, and a single spring connected between said idler wheel and said support for normally biasing said wheel into concurrent engagement with said motor driven element and the periphery of said turntable, said single spring also being operatively connected to the transmitting portion of the actuator for continuously biasing said manually depressible portion of said actuator to its outermost position thereby to return the manually depressible portion of the actuator to its outermost position after said portion has been depressed.

2. The system of claim 1 wherein the actuator has a substantially L-shaped configuration, said manually depressible portion of said actuator assuming a horizontal segment of said configuration and said motion transmitting portion of said actuator assuming a vertical segment of said configuration.

References Cited

UNITED STATES PATENTS

| | | | |
|---|---|---|---|
| 2,070,063 | 2/1937 | Pasinski | 235—7 |
| 3,220,734 | 11/1965 | Zarm | 274—9.1 |
| 2,567,092 | 9/1951 | Williams | 274—13 X |
| 3,210,082 | 10/1965 | Murata | 274—4 |

HARRY N. HAROIAN, Primary Examiner